(12) United States Patent
Isberg et al.

(10) Patent No.: US 8,569,918 B2
(45) Date of Patent: Oct. 29, 2013

(54) BEARING ASSEMBLY

(75) Inventors: Peter Isberg, Västerås (SE); Per-Olof Lindberg, Västerås (SE)

(73) Assignee: ABB AB (SE)

( * ) Notice: Subject to any disclaimer, the term of this patent is extended or adjusted under 35 U.S.C. 154(b) by 25 days.

(21) Appl. No.: 13/245,359

(22) Filed: Sep. 26, 2011

(65) Prior Publication Data

US 2012/0013214 A1    Jan. 19, 2012

Related U.S. Application Data

(63) Continuation of application No. PCT/EP2009/053569, filed on Mar. 26, 2009.

(51) Int. Cl.
*H02K 7/08* (2006.01)

(52) U.S. Cl.
USPC .............................. 310/90; 384/448; 384/428

(58) Field of Classification Search
USPC ...................... 310/90.5, 90, 91; 384/428, 448
See application file for complete search history.

(56) References Cited

U.S. PATENT DOCUMENTS

| | | | |
|---|---|---|---|
| 2,770,507 A | 11/1956 | Ehnts | |
| 5,272,403 A * | 12/1993 | New | 310/90.5 |
| 6,100,809 A | 8/2000 | Novoselsky et al. | |
| 6,891,290 B2 * | 5/2005 | Nagayama et al. | 310/58 |
| 7,736,062 B2 * | 6/2010 | Hagshenas et al. | 384/428 |
| 2004/0150270 A1 | 8/2004 | Nagayama et al. | |
| 2009/0074338 A1 | 3/2009 | Hagshenas et al. | |

FOREIGN PATENT DOCUMENTS

| | | |
|---|---|---|
| EP | 0411695 A2 | 2/1991 |
| GB | 2297361 A | 7/1996 |
| WO | 9953209 A1 | 10/1999 |

OTHER PUBLICATIONS

International Search Report and Written Opinion of the International Searching Authority; Application No. PCT/EP2009/053569; Issued: Sep. 9, 2010; 10 pages.

* cited by examiner

*Primary Examiner* — Tran Nguyen
*Assistant Examiner* — Leda Pham
(74) *Attorney, Agent, or Firm* — St. Onge Steward Johnston & Reens LLC

(57) ABSTRACT

A bearing assembly for an electrical motor, including a shaft, a housing, and a main bearing between the shaft and the housing, the shaft being surrounded by a rigid sleeve for functioning as an auxiliary bearing in case of a breakdown of the main bearing and as a grease sealing under normal operation.

11 Claims, 1 Drawing Sheet

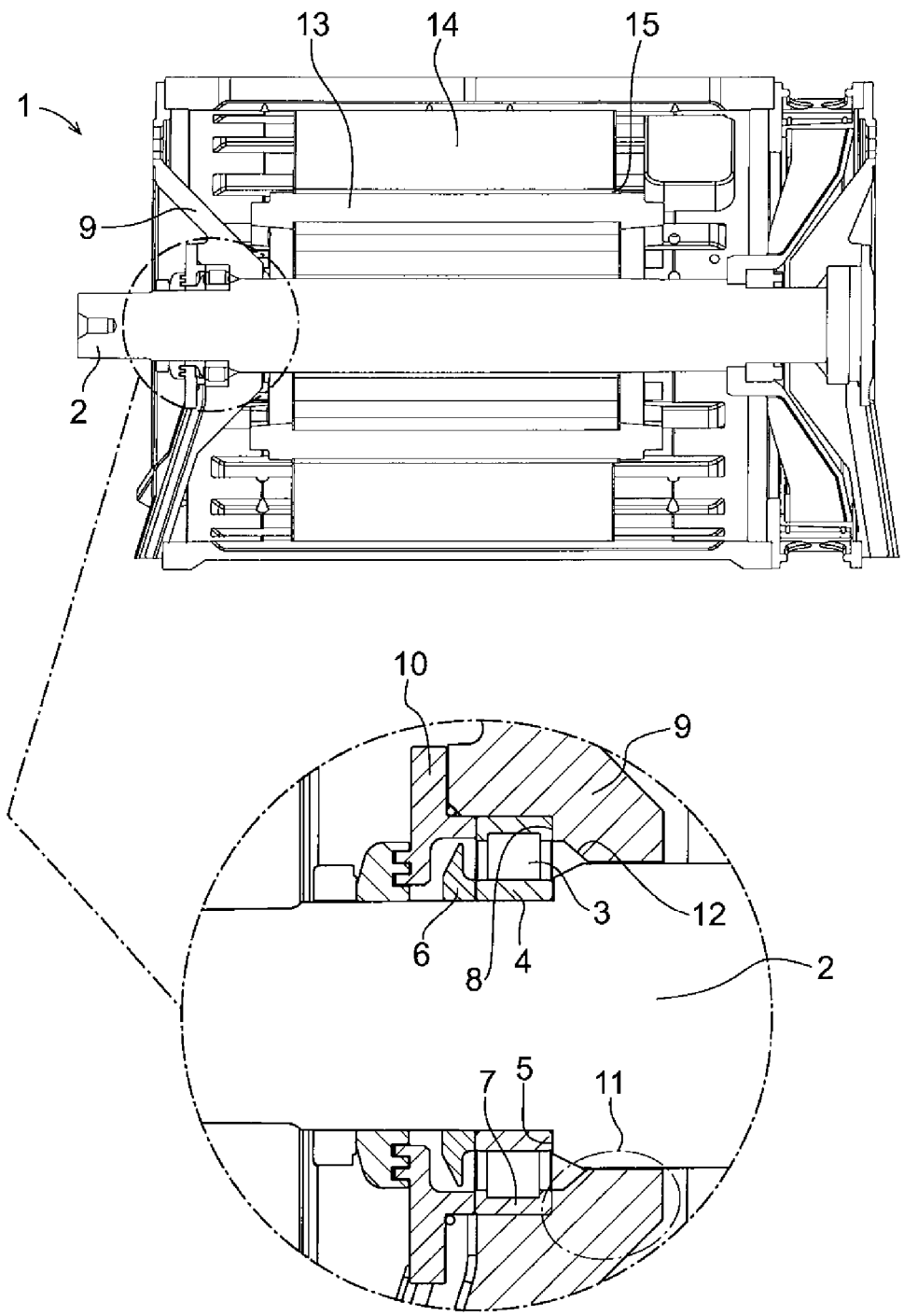

BEARING ASSEMBLY

CROSS-REFERENCE TO RELATED APPLICATIONS

The present application is a continuation of pending International patent application PCT/EP2009/053569 filed on Mar. 26, 2009 which designates the United States and the content of which is incorporated herein by reference.

FIELD OF THE INVENTION

The present invention relates to a bearing assembly for an electrical motor and to an electrical motor comprising such a bearing assembly.

BACKGROUND OF THE INVENTION

A shaft of an electrical motor is mounted on bearings at both of its ends. The bearings are typically supported by the end shields of the motor housing. When a bearing breaks down, the electrical motor can be damaged and eventually totally immobilized. In e.g. railway traction motor applications this means a stand still of the train and expensive measures to get a repair of the motor done either in situ or in a repair shop, in which case the locomotive must be transported by a service train or lifted off the track. These measures are clearly both expensive and time consuming.

In an electrical motor where grease from the bearing is prevented from entering the interior of the motor housing a conventional solution is either a rubber lip seal or a labyrinth seal. A lip seal is a wearing part and a labyrinth seal is a complicated component with high friction losses.

SUMMARY OF THE INVENTION

One aim of the present invention is thus to provide a bearing assembly making it possible for an electrical motor with a broken down bearing to continue functioning a limited time period, which arrangement also provides a safety function to prevent or minimise damage on the electrical motor.

Another aim of the invention is to provide an electrical motor with low friction losses and a maintenance free solution for a grease sealing.

According to one aspect of the invention there is provided a bearing assembly for an electrical motor, the bearing assembly comprising a shaft, a housing, and a main bearing between the shaft and the housing, wherein the shaft is surrounded by a rigid sleeve that functions as an auxiliary bearing in case of a breakdown of the main bearing, the clearance between the sleeve and the shaft being smaller than the air-gap between a stator and a rotor of the motor. The auxiliary bearing prevents the collision of the rotor and the stator of the motor in case of a failure of the main bearing.

The clearance between the sleeve and the shaft may be at most 0.6 mm, such as at most 0.3 mm, 0.2 mm, 0.1 mm or 0.05 mm. The air-gap between the stator and the rotor being typically in the range of 1.2 to 1.5 mm there is a good tolerance for preventing a collision. Also, a small clearance between the sleeve and the shaft works well as a grease sealing.

The width of the sleeve portion functioning as an auxiliary bearing may be at least 10 mm, such as at least 15 mm, 20 mm or 30 mm. In order to function as an auxiliary bearing the sleeve has to have a reasonable width that is able to carry the shaft load for a limited time period.

The clearance between the sleeve and the shaft may function as a grease sealing under normal operation conditions. By dimensioning the sleeve appropriately an additional function as a grease sealing is obtained.

The sleeve may be an integral part of the housing. By integrating the sleeve to the housing the advantages of reduced part number and rigidity of the construction are obtained.

The housing may comprise a motor end shield and the sleeve may be a part of the motor end shield. The housing of an electrical motor typically comprises a motor end shield in at least one end. Again, a reduced part number and rigidity of the construction are obtained.

The sleeve may be positioned between the main bearing and the interior of the housing. This is the correct order of the components when the sleeve is functioning as a grease sealing towards the interior.

The sleeve may have a portion of a conical inner surface facing the shaft and having an increasing diameter towards the main bearing for providing together with the centrifugal effect of a rotating shaft a pumping action directing grease from the region of the conical inner surface towards the main bearing. The pumping action contributes to the sealing performance and enables a maintenance free sealing.

The material of the sleeve may contain a lubricating agent. The lubricating agent contributes to the bearing function and enables a proper functioning for a limited time period. The lubricating agent may be graphite.

BRIEF DESCRIPTION OF THE DRAWINGS

The invention will be explained in greater detail with reference to the accompanying drawings, wherein FIG. 1 is a cross-sectional view of a traction motor comprising a bearing assembly according to one embodiment of the present invention.

DETAILED DESCRIPTION OF THE INVENTION

FIG. 1 shows a traction motor 1 comprising an end shield 9 supporting a shaft 2 on which an inner race 4 of a main bearing 3 is arranged. The inner race 4 is locked axially inwards against a first bearing seat 5 on the shaft 2 by an inner locking ring 6. A rotor 13 is arranged on the motor shaft 2.

An outer race 7 of the main bearing 3 is locked axially inwards against a second bearing seat 8 provided in the end shield 9 by an outer locking ring 10. The end shield 9 is a part of the motor housing and comprises a sleeve 11 that extends inwards from the second bearing seat 8. At the bearing seat 8 the sleeve 11 has a considerably larger inner diameter than that of the shaft 2, but the sleeve 11 tapers radial inwards to conform to the shaft 2 along some distance with only a slightly larger inner diameter such that the clearance between the sleeve 11 and the shaft 2 is about 0.05 to 0.6 mm. The clearance between the sleeve 11 and the shaft 2 is smaller than the air-gap 15 between the rotor 13 and stator 14 of the motor. In the event of a breakdown of the main bearing 3 the sleeve 11 will support the shaft 2 preventing the rotor 13 from colliding against the stator 14. The sleeve 11 therefore functions as an auxiliary bearing in case of a failure in the main bearing 3. This auxiliary bearing renders it possible to operate the motor 1 at a much reduced speed after a main bearing failure has occurred. The sleeve portion functioning as an auxiliary bearing has an appropriate width that is able to carry the shaft load for a limited time period. The sleeve width depends on the motor size and on the accessible space within the motor, but it can be in the range of 10 to 30 mm. The bearing function is facilitated by the use of iron with graphite content such as grey iron or nodular iron as the sleeve material, which graphite is able to partly lubricate this auxiliary bearing during a limited time.

The sleeve 11 also functions as an inner grease sealing. The grease is prevented from reaching the interior of the motor 1 by a pumping action from the cooperation of a conical inner surface 12 of the sleeve 11 and the rotating shaft 2. The centrifugal effect obtained with the rotating shaft 2 presses the grease radial outwards and axially back to the main bearing 3. Also the air between the shaft 2 and the sleeve 11 acts viscously in a small gap like that and thus prevents grease from forcing its way into the motor 1.

The sleeve 11 may in some embodiments be integral part of the motor housing at one of its ends i.e. the end shield 9 comprising the sleeve 11 may be manufactured in one part with the mantle of the motor housing.

An electrical motor may comprise a bearing assembly according to the present invention in one end or in both ends. In some cases an electrical motor may be directly connected to a gear box or some other external structure such that the motor 1 does not have an end shield 9 in one or both of its ends. In such cases a bearing assembly according to the present invention may be provided in the external structure.

The present invention is here disclosed in connection with traction motors but it is also possible to apply the same to other types of electrical motors.

The above detailed description is primarily only intended to facilitate the understanding of the invention and any unnecessary limitations shall not be interpreted therefrom. The modifications which become obvious to a person skilled in the art during a study of the description may be made without any deviations from the inventive idea or the scope of the appended patent claims.

What is claimed is:

1. A bearing assembly for an electrical motor, the bearing assembly comprising:
   a shaft, a housing, and a main bearing between the shaft and the housing,
   a rigid sleeve surrounding the shaft and being configured to function as an auxiliary bearing in case of a breakdown of the main bearing, and
   a clearance between the sleeve and the shaft, the clearance being smaller than an air-gap between a stator and a rotor of the motor,
   wherein the sleeve has a portion of a conical inner surface facing the shaft and having an increasing diameter towards the main bearing, the sleeve together with a centrifugal effect of the rotating shaft providing a pumping action that directs grease from a region of the conical inner surface towards the main bearing.

2. The bearing assembly of claim 1, wherein the clearance between the sleeve and the shaft is at most 0.6 mm.

3. The bearing assembly of claim 1, wherein the width of the sleeve portion functioning as the auxiliary bearing is at least 10 mm.

4. The bearing assembly of claim 1, wherein the clearance between the sleeve and the shaft functions as a grease sealing under normal operation conditions.

5. The bearing assembly of claim 1, wherein the sleeve is an integral part of the housing.

6. The bearing assembly of claim 1, wherein the housing includes a motor end shield and wherein the sleeve is a part of the motor end shield.

7. The bearing assembly of claim 1, wherein the sleeve is positioned between the main bearing and the interior of the housing.

8. The bearing assembly of claim 1, wherein the material of the sleeve contains a lubricating agent.

9. The bearing assembly of claim 8, wherein the lubricating agent is graphite.

10. An electrical motor comprising a bearing assembly comprising:
    a shaft, a housing, and a main bearing between the shaft and the housing,
    a rigid sleeve surrounding the shaft and being configured to function as an auxiliary bearing in case of a breakdown of the main bearing, and
    a clearance between the sleeve and the shaft, the clearance being smaller than an air-gap between a stator and a rotor of the motor,
    wherein the sleeve has a portion of a conical inner surface facing the shaft and having an increasing diameter towards the main bearing, the sleeve together with a centrifugal effect of the rotating shaft providing a pumping action that directs grease from a region of the conical inner surface towards the main bearing.

11. The electrical motor according to claim 10, wherein the electrical motor is a traction motor.

* * * * *